US012722657B2

(12) United States Patent
Lee

(10) Patent No.: US 12,722,657 B2
(45) Date of Patent: Sep. 1, 2026

(54) METHOD AND APPARATUS FOR AUTONOMOUS CONTROL OF VEHICLE

(71) Applicants: Hyundai Motor Company, Seoul (KR); Kia Corporation, Seoul (KR)

(72) Inventor: Yeong Ho Lee, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/971,526

(22) Filed: Dec. 6, 2024

(65) Prior Publication Data

US 2025/0368225 A1 Dec. 4, 2025

(30) Foreign Application Priority Data

May 29, 2024 (KR) ........................ 10-2024-0070226
Aug. 30, 2024 (KR) ........................ 10-2024-0117388

(51) Int. Cl.
*B60W 60/00* (2020.01)
*B60W 30/09* (2012.01)

(52) U.S. Cl.
CPC ......... *B60W 60/0015* (2020.02); *B60W 30/09* (2013.01); *B60W 2710/20* (2013.01); *B60W 2720/10* (2013.01)

(58) Field of Classification Search
None
See application file for complete search history.

(56) References Cited

U.S. PATENT DOCUMENTS

2005/0033516 A1* 2/2005 Kawasaki .............. G01C 21/26 340/436
2009/0192710 A1* 7/2009 Eidehall ............ B60W 50/0097 701/300
2022/0032454 A1* 2/2022 Yang ...................... B25J 9/1612
2023/0326335 A1* 10/2023 Ding ........................ G06N 5/01 701/117
2024/0427325 A1* 12/2024 Elliott .................... G06N 3/006

* cited by examiner

*Primary Examiner* — Daniel L Greene
(74) *Attorney, Agent, or Firm* — Fox Rothschild LLP

(57) ABSTRACT

A method for autonomous control of a vehicle includes steps of: acquiring driving information including one or more of a memory path, a user's driving method, a reference point, a forward target point, a next target point, an end point, and an obstacle list, from the vehicle or by detecting surroundings of the vehicle; configuring a control method for the vehicle based on a behavior tree by using the driving information; configuring a driving method for the vehicle based on the driving information and the control method; and controlling the vehicle by applying the driving method. The above steps can be performed by one or more sensors and a controller of the vehicle.

18 Claims, 11 Drawing Sheets

METHOD AND APPARATUS FOR AUTONOMOUS CONTROL OF VEHICLE

CROSS-REFERENCE TO RELATED APPLICATION

This application claims under 35 U.S.C. § 119 (a) the benefit of Korean Patent Application No. 10-2024-0070226 filed on May 29, 2024 and Korean Patent Application No. 10-2024-0117388 filed on Aug. 30, 2024, the entire contents of which are incorporated herein by reference.

BACKGROUND

(a) Technical Field

The present disclosure relates to a method and apparatus for autonomous control of a vehicle, more particularly, to the method and apparatus for autonomously controlling a vehicle based on a behavior tree, by taking surroundings of the vehicle into consideration.

(b) Description of the Related Art

There are various parking assistance technologies being developed that employ autonomous driving technology. Among parking assist features are a memory parking assist feature (MPA). The memory parking assist feature is a feature that saves a vehicle's driving method after a user parks the vehicle manually one time and, when the user comes back to the same location, automatically controls driving along a saved path to park the vehicle.

Parking lots sometimes have no distinct lanes and no pedestrian crossings or traffic lights. Thus, the user's driving method cannot be directly applied even to the same location, and speed control needs to be performed by taking into account obstacles and real-time traffic situations around the vehicle. This creates a demand for a system capable of determining whether a collision can be avoided in consideration of surroundings of a saved path and properly controlling speed.

Conventional vehicle control methods are based on finite state machine (FSM). The FSM-based control methods have limitations in terms of expandability since operational logics become very complex as the number of subtasks increases, thus making it difficult to maintain and repair the subtasks.

Behavior tree (BT)-based control methods allow for easy implementation of operational logic even with the increase in the number of subtasks, and makes the maintenance and repair of the subtasks easy. Accordingly, it would be desirable to implement a behavior-based autonomous control method.

SUMMARY

An aspect of the present disclosure is to determine whether a collision can be avoided in consideration of surroundings of a saved path and to control speed so as to prevent collisions.

Another aspect of the present disclosure is to allow for easy implementation of an operational logic for a vehicle and make the maintenance and repair of tasks easy, by configuring a control method based on a behavior tree.

The aspects of the present disclosure are not limited to the foregoing, and other aspects not mentioned herein will be able to be clearly understood by those skilled in the art from the following description.

According to an embodiment, the present disclosure provides an autonomous control method comprising: acquiring driving information including one or more of a memory path, a user's driving method, a reference point, a forward target point, a next target point, an end point, and an obstacle list, from a vehicle or by detecting surroundings of the vehicle; configuring a control method for the vehicle based on a behavior tree by using the driving information; configuring a driving method for the vehicle based on the driving information and the control method; and controlling the vehicle by applying the driving method.

According to another aspect, an autonomous control method for controlling operation of a vehicle may include: acquiring, by at least one sensor of the vehicle, driving information including one or more of a memory path, a user's driving method, a reference point, a forward target point, a next target point, an end point, and an obstacle list, from the vehicle or by detecting, by the at least one sensor, surroundings of the vehicle; configuring, by a controller, a control method for the vehicle based on a behavior tree by using the driving information; configuring, by the controller, a driving method for the vehicle based on the driving information and the control method; and controlling by the controller, the vehicle by applying the driving method.

According to another embodiment, the present disclosure provides an autonomous control apparatus comprising: at least one memory that stores instructions; and at least one processor, wherein, by executing the instructions, the at least one processor acquires driving information including one or more of a memory path, a user's driving method, a reference point, a forward target point, a next target point, an end point, and an obstacle list, from a vehicle or by detecting surroundings of the vehicle, configures a control method for the vehicle based on a behavior tree by using the driving information, configures a driving method for the vehicle by using the driving information and the control method, and controls the vehicle by applying the driving method.

A vehicle may include the autonomous control apparatus.

According to a further embodiment, the present disclosure provides a non-transitory computer-readable recording medium containing program instructions executed by a processor, including: program instructions that acquire driving information including one or more of a memory path, a user's driving method, a reference point, a forward target point, a next target point, an end point, and an obstacle list, from the vehicle or by detecting, by the at least one sensor, surroundings of a vehicle; program instructions that configure a control method for the vehicle based on a behavior tree by using the driving information; program instructions that configure a driving method for the vehicle based on the driving information and the control method; and program instructions that control the vehicle by applying the driving method.

According to an embodiment of the present disclosure, it is possible to determine whether a collision can be avoided in consideration of surroundings of a saved path and to control speed so as to prevent collisions.

According to an embodiment of the present disclosure, it is possible to allow for easy implementation of an operational logic for a vehicle and make the maintenance and repair of tasks easy, by configuring a control method based on a behavior tree.

The effects of the present disclosure are not limited to the foregoing, and other effects not mentioned herein will be able to be clearly understood by those skilled in the art from the following description.

DETAILED DESCRIPTION

Figure 1:
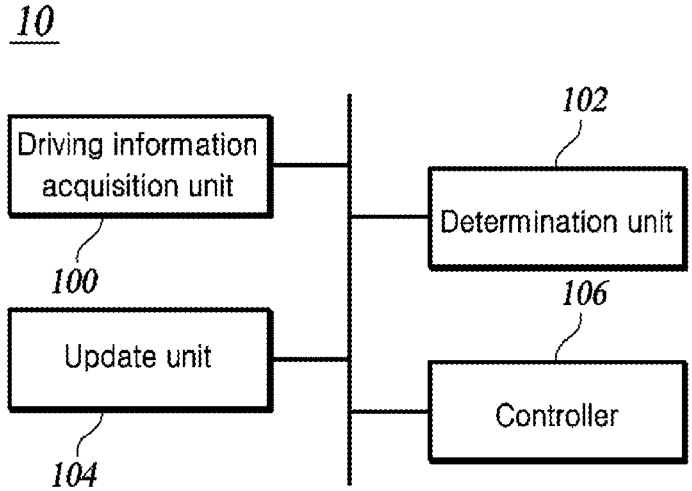
FIG. 1 is a block diagram schematically showing an autonomous control apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity.

Additionally, various terms such as first, second, A, B, (a), (b), etc., are used solely to differentiate one component from the other but not to imply or suggest the substances, order, or sequence of the components.

The following detailed description, together with the accompanying drawings, is intended to illustrate embodiments of the present disclosure and is not intended to represent the only embodiments in which the disclosure may be practiced.

Hereinafter, a "memory path" refers to the same path as traveled by a user to manually park a vehicle. A "forward target point" refers to a point that exists on the memory path, located 1 m from a reference point. A "next target point" refers to a point that exists on the memory path, located 2 m from the reference point. An "end point" is a point where the memory path ends. A "target area" is an area within a distance of 0.5 m transversely and 0.3 m longitudinally from the forward target point, and a "stop area" is an area within a distance of 0.5 m transversely and 0.3 m longitudinally from the end point. A "potential obstacle" refers to another vehicle that is traveling or stopped near the vehicle, and a "dangerous obstacle" refers to one of potential obstacles that should be avoided because it has the potential to collide with the vehicle.

The figures quoted in this specification are provided to explain an illustrative embodiment of the present disclosure, and may be changed according to the embodiment of the present disclosure.

An operation of an autonomous control apparatus is controlled based on a behavior tree. The behavior tree is a model for describing a complex operation as being composed of subtasks in a modular fashion. A parent node is a node at a higher level than a particular node, and a child node is a lower-level node connected to a particular node. A root node is the starting point for the behavior tree which performs a final subtask. A sequence node, which is a task type, executes its child nodes from the left to the right by depth first search (DFS). If a child node returns failure, the sequence node immediately stops the search and returns failure to the parent node. If all child nodes return success, the sequence node returns success to the parent node. A select node, which is a task type, executes its child nodes from the left to the right by depth first search. If a child node returns success, the select node immediately stops the search and returns success to the parent node. If a searched child node returns failure, the select node searches other child nodes to the right of the searched child node.

FIG. 1 is a block diagram schematically showing an autonomous control apparatus according to an embodiment of the present disclosure.

FIGS. 2A to 2G are illustrative drawings for explaining an operation of an autonomous control apparatus according to an embodiment of the present disclosure.

An autonomous control apparatus 10 according to an embodiment of the present disclosure may include all or some of a driving information acquisition unit 100, a determination unit 102, an update unit 104, and a controller 106. It should be noted that not all of the blocks shown in FIG. 1 are essential components, and that, in other embodiments, some blocks included in the autonomous control apparatus 10 may be added, altered, or removed. Meanwhile, the components shown in FIG. 1 show functionally distinct elements, and at least one component may be implemented in such a manner as to be integrated together in an actual physical environment.

Each of the above units may constitute modules and/or devices of the autonomous control apparatus 10, which may be a controller. For example, the above units of autonomous control apparatus 10 may constitute hardware controllers each having a processor and memory. The navigation apparatus 10 may include one or more processors and memory.

The driving information acquisition unit 100 may acquire driving information from a vehicle, e.g., by utilizing one or more vehicle sensors. The driving information acquisition unit 100 may acquire driving information by detecting surroundings of the vehicle, e.g., via one or more sensors and/or detectors. Here, the driving information includes a vehicle status, a memory path, a reference point, a forward target point, a next target point, an end point, a vehicle identifier, a driving method applied when the user drives along the same path as the memory path, and parking lot information. Here, the driving method includes vehicle speed, steering angle, braking distance, and braking time. Here, the parking lot information includes a list of obstacles around the vehicle, parking lot congestion, and availability of parking space. Here, the obstacle list includes the presence or absence of a potential obstacle, potential obstacle information, the presence or absence of a dangerous obstacle, and dangerous obstacle information.

The determination unit 102 checks the obstacle list to determine whether it contains a potential obstacle. The determination unit 102 checks the obstacle list to determine whether it contains a dangerous obstacle.

Figure 2A:
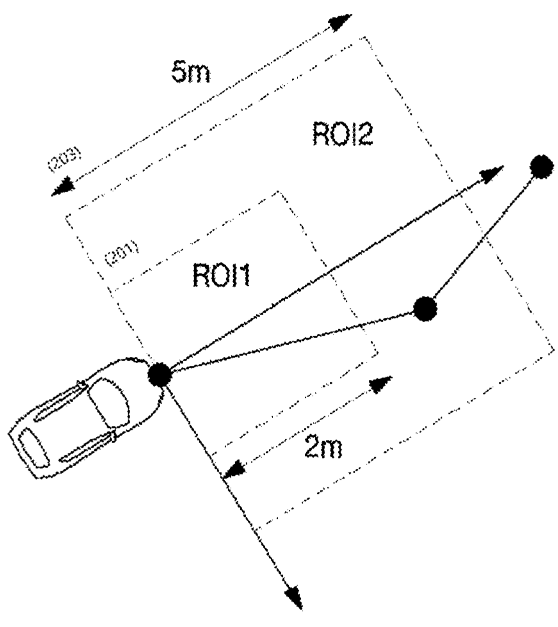
FIGS. 2A to 2G are illustrative drawings for explaining an operation of an autonomous control apparatus according to an embodiment of the present disclosure.
Figure 2A:
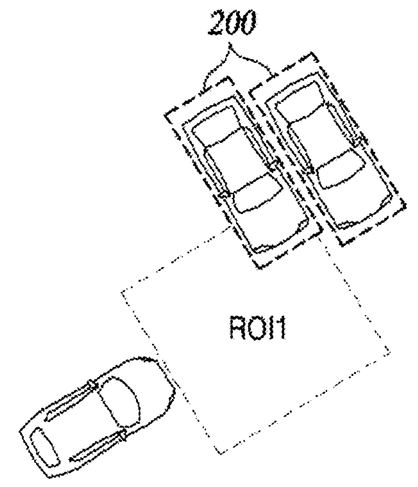

The determination unit 102 selects a dangerous obstacle candidate pool from among potential obstacles around the vehicle. Referring to FIG. 2A, a square SHAP1 area 201 is defined whose sides are 2 m long and parallel to the coordinate axes relative to the center of the front of the vehicle, and a square SHAP2 area 203 is defined whose sides are 5 m long. The SHAP1 area is set as an ROI1 area, and an area included in the SHAP2 area but not included in the SHAP1 area is set as an ROI2 area. A rectangular area that is the smallest axis-aligned bounding box containing a potential obstacle is set as a CAN area 200. A potential obstacle whose CAN area, even if only partially, belongs to the ROI1 or ROI2 area is selected as the dangerous obstacle candidate pool, and a potential obstacle whose entire CAN area does not belong to the ROI1 or ROI2 area is excluded from the dangerous obstacle candidate pool.

Figure 2B:
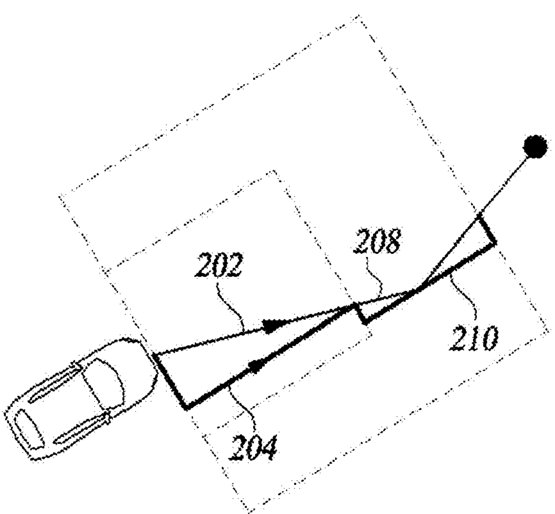
Figure 2B:
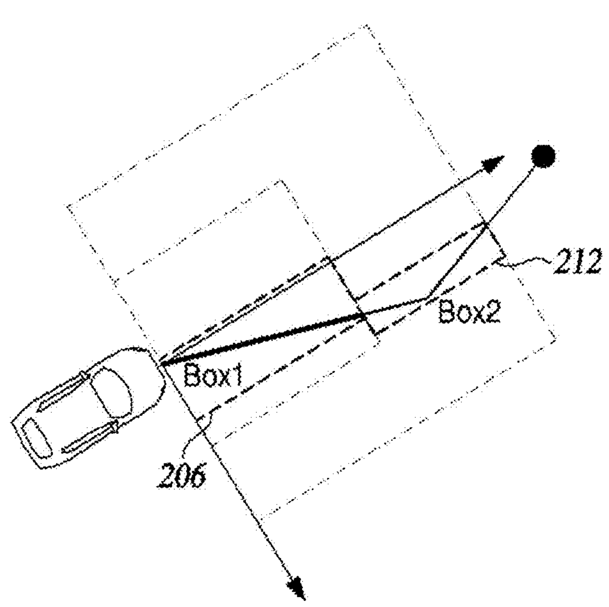
Figure 2C:
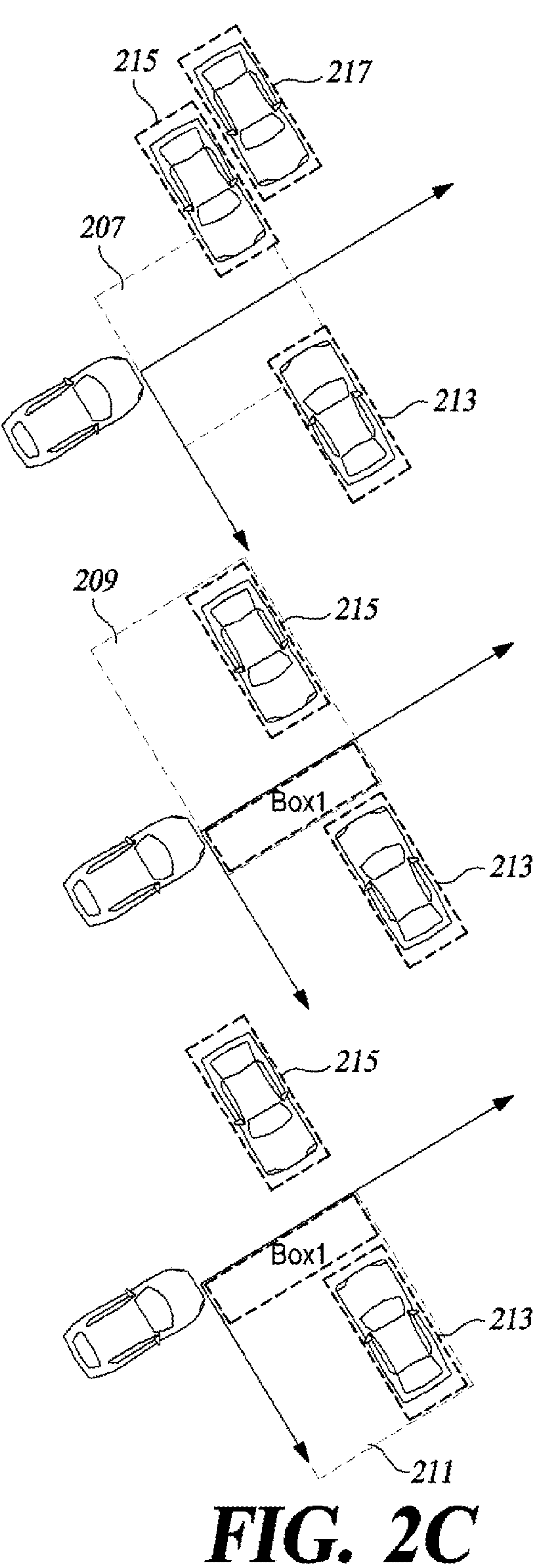

The determination unit 102 specifies a dangerous obstacle among the dangerous obstacle candidate pool. Referring to FIG. 2B and FIG. 2C, a rectangular area that is the smallest axis-aligned bounding box containing a memory path 202 belonging to the ROI1 area and a path 204 formed by moving the points of intersection between the memory path belonging to the ROI1 area and the ROI1 area along a direction parallel to a coordinate axis is set as a BOX1 area 206. A rectangular area that is the smallest axis-aligned bounding box containing a memory path 208 belonging to the ROI2 area and a path 210 formed by moving the points of intersection between the memory path belonging to the ROI2 area and the ROI2 area along a direction parallel to a coordinate axis is set as a BOX2 area 212. A rectangular area that is the smallest axis-aligned bounding box containing the CAN area of a dangerous obstacle candidate belonging to the ROI1 area and the BOX1 area is set as a DGR area. A dangerous obstacle candidate whose DGR area is the smallest in width among a dangerous obstacle candidate pool for the ROI1 area is specified as a dangerous obstacle in the ROI1 area. A rectangular area that is the smallest axis-aligned bounding box containing the CAN area of a dangerous obstacle candidate belonging to the ROI2 area and the BOX2 area is set as a DGR area. A dangerous obstacle candidate whose DGR area is the smallest in width among a dangerous obstacle candidate pool for the ROI2 area is specified as a dangerous obstacle in the ROI2 area.

For example, the vehicle 217 of FIG. 2C is excluded from the dangerous obstacle candidate pool for the ROI1 area since the entire CAN area does not belong to the ROI1 area 207. The vehicle 213 and the vehicle 215 are selected as the dangerous obstacle candidate pool for the ROI1 area since the CAN area partially belongs to the ROI1 area. When the width of the DGR area 209 of the vehicle 215 is compared with the width of the DGR area 211 of the vehicle 213, the DGR area 211 of the vehicle 213 is smaller in width, and therefore the vehicle 213 is specified as a dangerous obstacle in the ROI1 area.

Figure 2D:
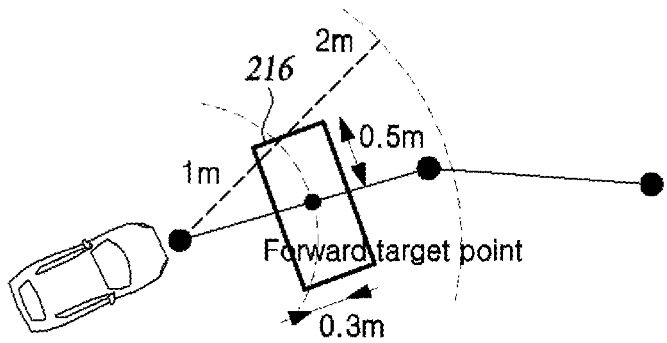

The determination unit 102 determines whether the vehicle has reached a target area 216 based on the distance between the front center point of the vehicle and a forward target point. Referring to FIG. 2D, if the front center point of the vehicle is within the target area, it is determined that the vehicle has reached the target area.

The determination unit 102 determines whether the vehicle has reached a stop area based on the distance between the front center point of the vehicle and an end point. If the front center point of the vehicle is within the stop area, it is determined that the vehicle has reached the stop area.

Figure 2E:
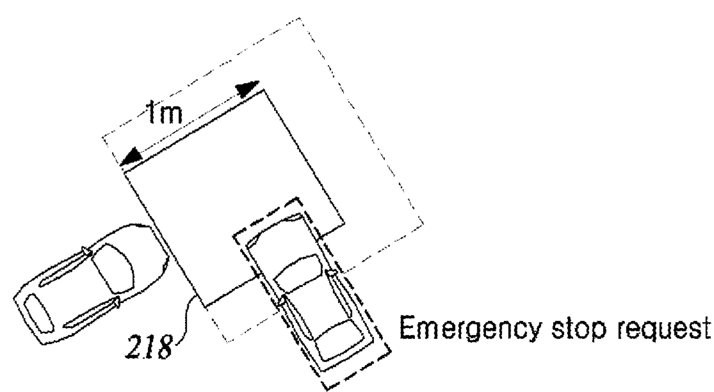

The determination unit 102 determines whether a dangerous obstacle is present in an emergency braking area 218. Referring to FIG. 2E, if the CAN area of the dangerous obstacle, even if only partially, belongs to the emergency braking area, it is determined that the dangerous obstacle is present in the emergency braking area. If the entire CAN area of the dangerous obstacle does not belong to the emergency braking area, it is determined that the dangerous obstacle is not present in the emergency braking area. Here, the emergency braking area is a square area that is 1 m wide and 1 m long that is parallel to the coordinate axes relative to the front center point of the vehicle.

Figure 2F:
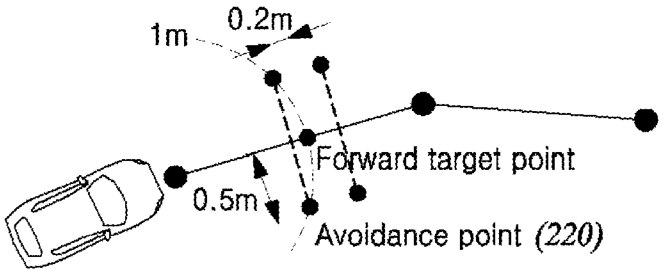
Figure 2F:
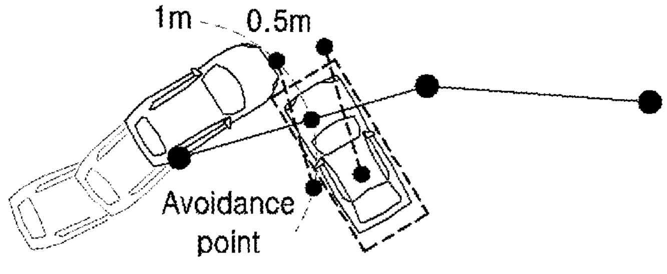

The determination unit 102 determines whether a collision between the vehicle and the dangerous obstacle can be avoided. Referring to FIG. 2F, given that the direction of a straight line joining the front center point of the vehicle and the forward target point is a longitudinal direction, avoidance points 220 located 0.2 m longitudinally and 0.5 m transversely from the forward target point are generated. Positions from which the vehicle moves toward an avoidance point over a course of 10 steps are predicted, and if there is no collision with the dangerous obstacle at the predicted positions, it is determined that a collision between the vehicle and the dangerous obstacle can be avoided. Here, the steps are the positions between which the vehicle moves within a preset length of time.

Figure 2G:
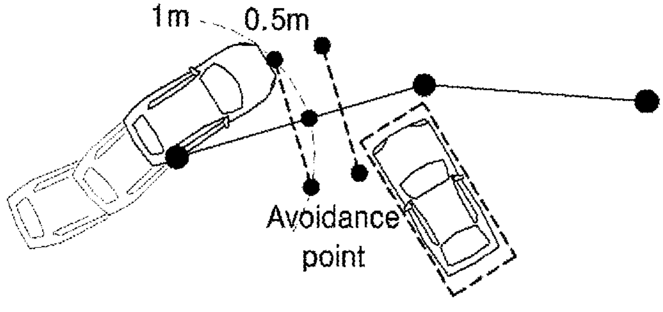
Figure 2G:
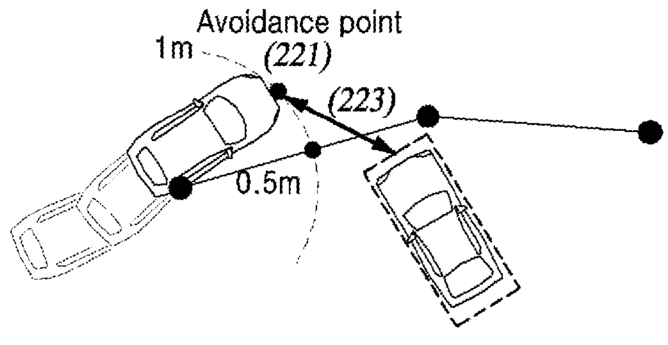
Figure 2G:
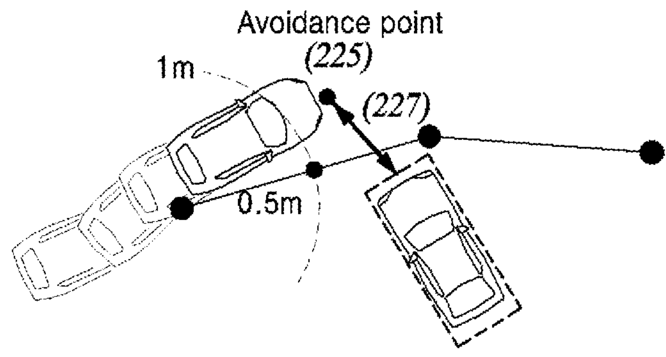

The determination unit 102 generates an avoidance path for the vehicle based on the avoidance points. Referring to FIG. 2G, the determination unit 102 generates an avoidance path by selecting one of the avoidance points where it is deemed that a collision between the vehicle and the dangerous obstacle can be avoided, as a target point where the minimum distance between the front center point of the vehicle and the dangerous obstacle is expected to be the largest when the vehicle arrives at the avoidance point.

For example, once it is determined that no collision will occur between the vehicle and the obstacle at the avoidance points 221 and 225, the distance 227 between the front center point of the vehicle and the dangerous obstacle when the vehicle arrives at the avoidance point 225 is smaller than the distance 223 between the front center point of the vehicle and the dangerous obstacle when the vehicle arrives at the avoidance point 221. Thus, the avoidance path is generated by setting the avoidance point 225 as a target point.

The update unit 104 updates the obstacle list by taking driving information into account.

The update unit 104 updates the reference point. An initial reference point is the front center point of the vehicle. The reference point is updated to be the front center point of the vehicle when the front center of the vehicle arrives at a target area.

The update unit 104 updates the forward target point. Once the vehicle arrives at a target area, a next target point is set as a new forward target point. If the end point is present within a preset distance from the reference point, the end point is set as the forward target point. For example, if the distance to the end point by which the end point can be used as the forward target point is set to 2 m or less, the end point is set the forward target point as long as the end point is present within a distance of 2 m, even if the next target point is 2 m away from the reference point.

The controller 106 controls the vehicle to travel along a memory path. The controller 106 may apply a driving method applied when the user drives along the same path as the memory path. Upon determining that a dangerous obstacle is approaching the vehicle, the controller 106 may control the vehicle to travel within 0.5 m of the memory path. Upon determining that there is no dangerous obstacle, the controller 106 may control the vehicle to maintain its speed. Upon determining that a dangerous obstacle is present in the emergency braking area, the controller 106 may control the vehicle to stop.

Figure 3:
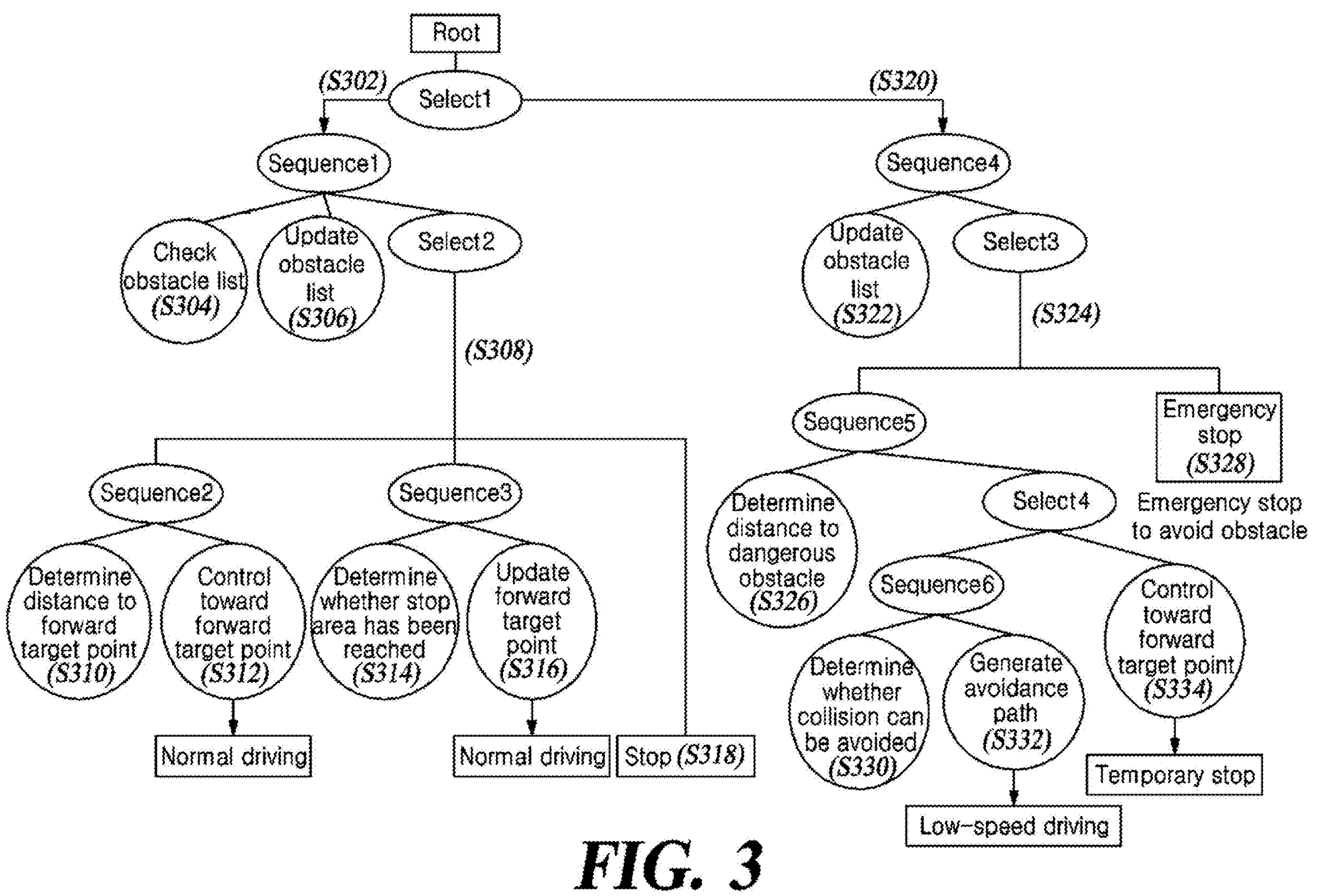
FIG. 3 is a behavior tree showing an operation of an autonomous control apparatus according to an embodiment of the present disclosure.

FIG. 3 is a behavior tree showing an operation of an autonomous control apparatus according to an embodiment of the present disclosure.

Select1 node is a child node of a root node which is the topmost node. Sequence1 node and Sequence4 node are child nodes of Select1 node.

The autonomous control apparatus 10 searches subnodes by DFS, and starts a search from Sequence1 node which is a child node to the left of Select1 node (S302).

Select2 node is a child node of Sequence1 node.

The autonomous control apparatus 10 checks an obstacle list and determines whether a potential obstacle is contained in the obstacle list (S304). Upon determining that a potential obstacle is contained in the obstacle list, the autonomous control apparatus 10 returns failure to Sequence1 node, and upon determining that no potential obstacle is contained in it, returns success to Sequence1 node.

The autonomous control apparatus 10 updates the obstacle list by taking driving information into account, and determines whether a dangerous obstacle is contained in the obstacle list (S306). The autonomous control apparatus 10 selects some of potential obstacles around the vehicle as a dangerous obstacle candidate pool. The autonomous control apparatus 10 specifies a dangerous obstacle among the dangerous obstacle candidate pool. Upon determining that a dangerous obstacle in an ROI1 area or an ROI2 area is not contained in the updated obstacle list, the autonomous control apparatus 10 returns success to Sequence1 node. Upon determining that a dangerous obstacle in the ROI1 area or the ROI2 area is contained in the updated obstacle list, the autonomous control apparatus 10 returns failure to Sequence1 node.

Upon determining that no potential obstacle is contained in the obstacle list, or upon determining that no dangerous obstacle is contained in the updated obstacle list, the autonomous control apparatus 10 determines a driving method by using Select2 node (S308).

Sequence2 node and Sequence3 node are child nodes of Select2 node.

The autonomous control apparatus 10 determines whether the vehicle has reached a target area based on the distance between the front center point of the vehicle and a forward target point (S310). Upon determining that the vehicle has not reached the target area, the autonomous control apparatus 10 returns success to Sequence2 node. Upon determining that the vehicle has reached the target area, the autonomous control apparatus 10 returns failure to Sequence2 node.

The autonomous control apparatus 10 controls the speed and steering of the vehicle toward the front target point (S312). A driving method applied when the user drives along the same path as the memory path may be applied. The autonomous control apparatus 10 returns success to Sequence2 node and configures a control method so as to control the speed and steering of the vehicle.

The autonomous control apparatus 10 determines whether the vehicle has reached a stop area based on the distance between the front center point of the vehicle and an end point (S314). Upon determining that the vehicle has not reached the stop area, the autonomous control apparatus 10 returns success to Sequence3 node. Upon determining that the vehicle has reached the stop area, the autonomous control apparatus 10 returns failure to Sequence3 node.

The autonomous control apparatus 10 updates the forward target point (S316). Once the vehicle arrives at the target area, a next target point is set as the forward target point. If the end point is present within 2 m of the front center point of the vehicle, the end point is set as the forward target point. The autonomous control apparatus 10 controls the speed and steering of the vehicle toward the new forward target point. A driving method applied when the user drives along the same path as the memory path may be applied. The autonomous control apparatus 10 returns success to Sequence3 node and configures a control method for updating the forward target point.

Upon determining that the vehicle has reached the stop area, the autonomous control apparatus 10 controls the vehicle to stop (S318). The autonomous control apparatus 10 returns success to Select2 node and configures a control method for stopping the vehicle.

If Sequence1 node returns failure, the autonomous control apparatus 10 searches Sequence4 node (S320).

The autonomous control apparatus 10 updates the obstacle list and determines whether a dangerous obstacle is contained in the obstacle list (S322). The autonomous control apparatus 10 selects some of potential obstacles around the vehicle as a dangerous obstacle candidate pool. The autonomous control apparatus 10 specifies a dangerous obstacle among the dangerous obstacle candidate pool. Upon determining that no dangerous obstacle in the ROI1 area or the ROI2 area is contained in the updated obstacle list, the autonomous control apparatus 10 returns failure to Sequence4 node. Upon determining that dangerous obstacle in the ROI1 area or the ROI2 area is contained in the updated obstacle list, the autonomous control apparatus 10 returns success to Sequence4 node. The autonomous control apparatus 10 may use task results that have ever been executed at other nodes. For example, the autonomous control apparatus 10 may re-use the results of S306.

Select3 node is a child node of Sequence4 node.

The autonomous control apparatus 10 determines a driving method by using Select3 node when a dangerous obstacle is present (S324).

Sequence5 node is a child node of Select3 node.

The autonomous control apparatus 10 determines whether a dangerous obstacle is present in an emergency braking area based on the distance between the front center point of the vehicle and the dangerous obstacle (S326). Upon determining that the dangerous obstacle is not present in the emergency braking area, the autonomous control apparatus 10 returns success to Sequence5 node. Upon determining that the dangerous obstacle is present in the emergency braking area, the autonomous control apparatus 10 returns failure to Sequence5 node.

Upon determining that the dangerous obstacle is present in the emergency braking area, the autonomous control apparatus 10 controls the vehicle to stop (S328). The autonomous control apparatus 10 returns success to Select3 node and configures a control method so as to stop the vehicle.

Select4 node is a child node of Sequence5 node. Sequence6 node is a child node of Select4 node.

Upon determining that the dangerous obstacle is not present in the emergency braking area, the autonomous control apparatus 10 generates avoidance points and determines whether a collision between the vehicle and the dangerous obstacle can be avoided (S330). The autonomous control apparatus 10 predicts positions from which the vehicle moves toward an avoidance point over a course of 10 steps and determines whether a collision between the vehicle and the dangerous obstacle can be avoided. Upon determining that a collision between the vehicle and the dangerous obstacle can be avoided at one or more avoidance points, the autonomous control apparatus 10 returns success to Sequence6 node. Upon determining that a collision between the vehicle and the dangerous obstacle cannot be avoided at any avoidance point, the autonomous control apparatus 10 returns failure to Sequence6 node.

The autonomous control apparatus 10 generates an avoidance path toward an avoidance point and controls the vehicle to travel along the avoidance path (S332). An avoidance path may be generated by selecting one of the avoidance points where it is deemed that a collision between the vehicle and the dangerous obstacle can be avoided, as a forward target point where the minimum distance between the front center point of the vehicle and the dangerous obstacle is expected to be the largest when the vehicle arrives at the avoidance point. The autonomous control apparatus 10 may control the vehicle to travel at a low speed when driving on the avoidance path. The autonomous control apparatus 10 returns success to Sequence6 node and configures a control method for the vehicle.

Upon determining that a collision between the vehicle and the dangerous obstacle cannot be avoided at any avoidance point, the autonomous control apparatus 10 controls the speed and steering of the vehicle toward the forward target point. A driving method applied when the user drives along the same path as the memory path may be applied. The results of S312 may be re-used. The autonomous control apparatus 10 may control the vehicle to stop temporarily at a point where it is expected to collide with the dangerous obstacle (S334). The autonomous control apparatus 10 returns success to Select4 node and configures a control method so as to control the speed and steering of the vehicle.

Figure 4:
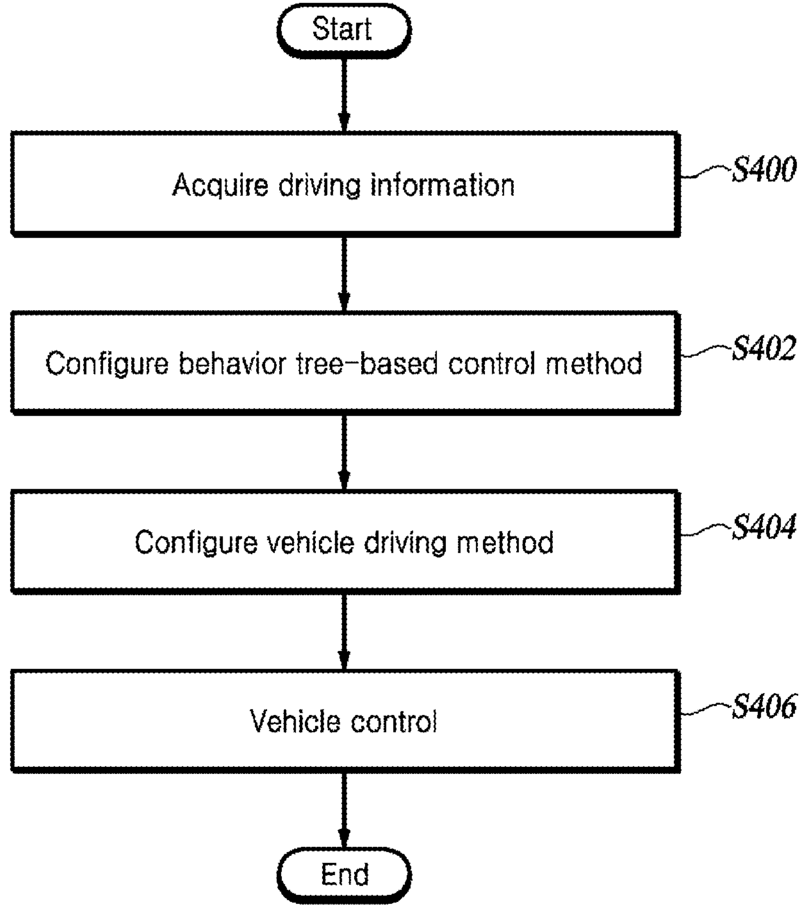
FIG. 4 is a flowchart for explaining an autonomous control method according to an embodiment of the present disclosure.

FIG. 4 is a flowchart for explaining an autonomous control method according to an embodiment of the present disclosure. The method shown in FIG. 4 may be implemented by being executed by an autonomous control system including one or more physical computing devices. The following description will be given in terms of an operation performed by the autonomous control system.

The autonomous control system acquires driving information from a vehicle (S400). The autonomous control system may acquire driving information by detecting surroundings of the vehicle. Here, the driving information includes a vehicle status, a memory path, a reference point, a forward target point, a next target point, an end point, a vehicle identifier, a driving method applied when the user drives along the same path as the memory path, and parking lot information. Here, the driving method includes vehicle speed, steering angle, braking distance, and braking time. Here, the parking lot information includes a list of obstacles around the vehicle, parking lot congestion, and availability of parking space. Here, the obstacle list includes the presence or absence of a potential obstacle, potential obstacle information, the presence or absence of a dangerous obstacle, and dangerous obstacle information.

The autonomous control system configures a behavior tree-based control method (S402). The behavior tree-based control method for the autonomous control system is identical or equivalent to the behavior tree-based control method for the autonomous control apparatus 10 described above with reference to FIG. 3, for example, and redundant explanations will be omitted.

The autonomous control system configures a vehicle driving method by analyzing the driving information by using a behavior tree (S404). For example, upon determining that a potential obstacle is contained in an obstacle list, the autonomous control system updates the obstacle list and determines whether a dangerous obstacle is contained in the updated obstacle list. Upon determining that no dangerous obstacle is contained, it is determined whether the vehicle has reached a target area based on the distance between the front center point of the vehicle and a forward target point. Upon determining that the vehicle has not reached the target area, a control method is configured so as to control the speed and steering of the vehicle toward the forward target point. Upon determining that the vehicle has reached the target area, it is determined whether the vehicle has reached a stop area. Upon determining that the vehicle has not reached the stop area, a control method is configured so as to configure a next target point or an end point as a new forward target point and to control the speed and steering of the vehicle toward the new forward target point.

As another example, the obstacle list may be updated, and upon determining that a dangerous obstacle is contained in the updated obstacle list, the autonomous control system determines whether the dangerous obstacle is present in an emergency braking area based on the distance between the front center point of the vehicle and the dangerous obstacle. Upon determining that the dangerous obstacle is present in the emergency braking area, a control method for the vehicle is configured so as to stop the vehicle. Upon determining that the dangerous obstacle is not present in the emergency braking area, the autonomous control system generates avoidance points and determines whether a collision between the vehicle and the dangerous obstacle can be avoided when the vehicle travels toward the avoidance points. Upon determining that a collision between the vehicle and the dangerous obstacle can be avoided at one or more avoidance points, an avoidance path toward the avoidance point(s) is generated, and a control method is configured so as to allow the vehicle to travel at a low sped along the avoidance path. Upon determining that a collision between the vehicle and the dangerous obstacle cannot be avoided at any avoidance point, a control method is configured so as to control the speed and steering of the vehicle toward the forward target point. The autonomous control system configures a control method so as to temporarily stop the vehicle at a point where a collision between the vehicle and the dangerous obstacle is expected.

The autonomous control system controls the vehicle by applying a configured driving method (S406). The autonomous control system may control the vehicle to travel by a driving method applied when the user drives along the same path as the memory path. Upon determining that a dangerous obstacle is approaching the vehicle, the autonomous control system may control the vehicle to travel within 0.5 m of the memory path. Upon determining that no dangerous obstacle is present, the autonomous control system may control the vehicle to maintain its speed. Upon determining that a dangerous obstacle is present in an emergency braking area, the autonomous control system may control the vehicle to stop.

Figure 5:
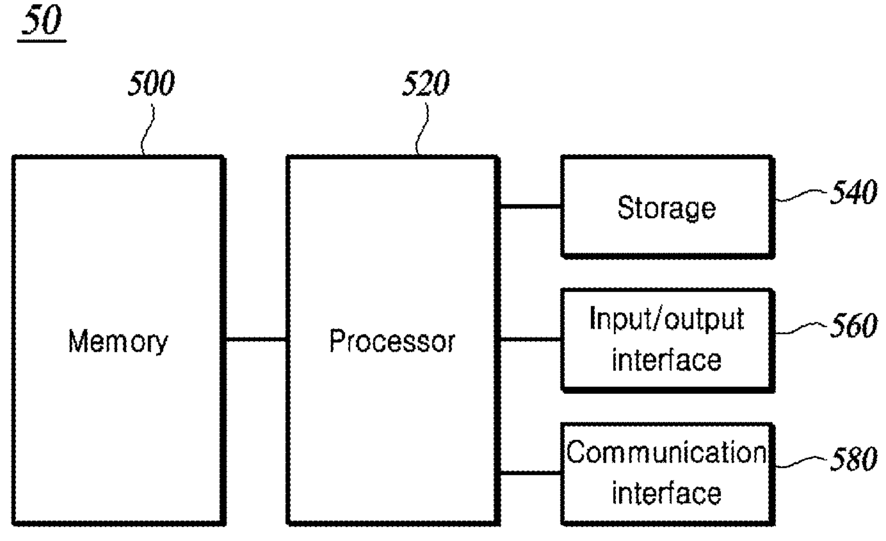
FIG. 5 is a block diagram schematically showing an exemplary computing device that can be used to implement a method according to the present disclosure.

FIG. 5 is a block diagram schematically showing an exemplary computing device that can be used to implement a method according to the present disclosure.

The computing device 50 may include some or all of a memory 500, a processor 520, storage 540, an input/output interface 560, and a communication interface 580. The computing device 50 may structurally and/or functionally include at least some of the autonomous control apparatus 10. The computing device 50 may be a stationary computing device such as a desktop computer, a server, an AI accelerator, etc., or may be a portable computing device such as a laptop computer, a smartphone, etc.

The memory 500 may store a program that allows the processor 520 to perform a method or operation according to various embodiments of the present disclosure. For example, the program may include a plurality of instructions executable by the processor 520, and the method shown in FIG. 7 may be performed as the plurality of instructions are executed by the processor 520.

The memory 500 may be a single memory or multiple memories. In this case, information needed to perform a method or operation according to various embodiments of the present disclosure may be stored in the single memory or stored in the multiple memories in a distributed manner. If the memory 500 includes multiple memories, the multiple memories may be physically separated.

The memory 500 may include at least one of a volatile memory and a non-volatile memory. The volatile memory includes SRAM (static random access memory) or DRAM (dynamic random access memory), and the non-volatile memory includes a flash memory.

The processor 520 may include at least one core for executing at least one instruction. The processor 520 may execute the instructions stored in the memory 500. The processor 520 may be a single processor or a plurality of processors.

The storage 540 retains stored data even if the power supplied to the computing device 50 is cut off. For example, the storage 540 may include a non-volatile memory and or include a storage medium such as a magnetic tape, an optical disc, or a magnetic disc.

A program stored in the storage 540 may be loaded onto the memory 500 before executed by the processor 520. The storage 540 may store a file made using a program language, and a program created by a compiler or the like from the file may be loaded onto the memory 500. The storage 540 may store data to be processed by the processor 520 and/or data processed by the processor 520.

The input/output interface 560 may include an input device such as a keyboard, a mouse, etc., and may include an output device such as a display device, a printer, etc. The user may trigger execution of a program by the processor 520 via the input/output interface and/or check processing results from the processor 520.

The communication interface 580 may provide access to an external network. For example, the computing device 50 may communicate with other devices via the communication interface 580.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

A computer-readable recording medium includes any type of recording device that stores data that can be read by a computer system. Such a computer-readable recording medium may be a non-volatile or non-transitory medium, such as a ROM, CD-ROM, magnetic tape, floppy disk, memory card, hard disk, optical magnetic disk, or storage device, and may further include a transitory medium, such as a data transmission medium. The computer-readable recording medium may also be distributed across a networked computer system, such that the computer-readable code is stored and executed in a distributed manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An autonomous control method for controlling operation of a vehicle, the autonomous control method comprising:

acquiring, by at least one sensor of the vehicle, driving information including one or more of a memory path, a user's driving method, a reference point, a forward target point, a next target point, an end point, and an obstacle list, from the vehicle or by detecting, by the at least one sensor, surroundings of the vehicle;

configuring, by a controller, a control method for the vehicle based on a behavior tree by using the driving information;

configuring, by the controller, a driving method for the vehicle based on the driving information and the control method; and controlling by the controller, the vehicle by applying the driving method, wherein the memory path is a same path as traveled by a user to manually park the vehicle, wherein the reference point is defined as a front center point of the vehicle, wherein the forward target point is on the memory path and spaced apart from the reference point by a first distance, wherein the next target point is on the memory path and spaced apart from the reference point by a second distance greater than the first distance, wherein the obstacle list includes a list of obstacles around the vehicle, and wherein configuring the control method further comprises:

determining whether a dangerous obstacle is contained in the obstacle list;

calculating avoidance points spaced apart from the forward target point by a predetermined distance in a longitudinal direction and a transverse direction; and generating an avoidance path based on the avoidance points upon determining that the dangerous obstacle is contained in the obstacle list, wherein the dangerous obstacle corresponds to an obstacle in which at least a portion of a bounding box of the obstacle is contained in a region of interest (ROI) in front of the vehicle.

2. The autonomous control method of claim 1, wherein the behavior tree is a structure that allows for re-use of results of the same task at other nodes.

3. The autonomous control method of claim 1, further comprising, given that the reference point is the front center point of the vehicle, updating the reference point to be the front center point of the vehicle if it is determined that the vehicle has reached a target area.

4. The autonomous control method of claim 1, wherein configuring the control method includes:

checking the obstacle list to determine whether a potential obstacle is contained in the obstacle list; and updating the obstacle list based on the driving information and determining whether a dangerous obstacle is contained in the updated obstacle list, wherein configuring the control method further comprises, upon determining that the dangerous obstacle is present in an emergency braking area, stopping the vehicle, wherein the potential obstacle having an area not contained within the ROI is excluded as being the dangerous obstacle, and wherein the emergency braking area is smaller than the ROI.

5. The autonomous control method of claim 4, wherein configuring the control method includes:

if it is determined that the potential obstacle is not contained in the obstacle list, or if it is determined that the dangerous obstacle is not contained in the updated obstacle list, it is determined whether the vehicle has reached a target area based on the distance between the front center point of the vehicle and the forward target point.

6. The autonomous control method of claim 5, wherein configuring the control method includes:

if it is determined that the vehicle has not reached the target area, the control method for the vehicle is configured so as to control the speed and steering of the vehicle by applying a driving method applied when the user drives along the same path as the memory path toward the forward target point.

7. The autonomous control method of claim 5, wherein configuring the control method includes:

if it is determined that the vehicle has reached the target area, it is determined whether the vehicle has reached a stop area based on the distance between the front center point of the vehicle and the end point.

8. The autonomous control method of claim 7, wherein configuring the control method includes:

if it is determined that the vehicle has not reached the stop area, the next target point is set as the forward target point, and the end point is set as the forward target point if the end point is present within a preset distance from the reference point.

9. The autonomous control method of claim 8, wherein configuring the control method includes:

if it is determined that the vehicle has reached the stop area, the control method for the vehicle is configured so as to stop the vehicle.

10. The autonomous control method of claim 1, wherein the configuring of a control method includes:

if it is determined that the dangerous obstacle is not present in the emergency braking area, one or more avoidance points are generated to determine whether a collision between the vehicle and the dangerous obstacle can be avoided.

11. The autonomous control method of claim 10, wherein configuring the control method includes:

if it is determined that a collision between the vehicle and the dangerous obstacle can be avoided at the one or more avoidance points, an avoidance path toward the avoidance point(s) is generated, and a control method for the vehicle is configured so as to allow the vehicle to travel along the avoidance path.

12. The autonomous control method of claim 11, wherein the avoidance path is a path that is generated by selecting one of the avoidance points where it is deemed that a collision between the vehicle and the dangerous obstacle can be avoided, as a forward target point where the minimum distance between the front center point of the vehicle and the dangerous obstacle is expected to be the largest when the vehicle arrives at the avoidance point.

13. The autonomous control method of claim 10, wherein configuring the control method includes:

if it is determined that a collision between the vehicle and the dangerous obstacle cannot be avoided at any avoidance point, the control method for the vehicle is configured so as to stop the vehicle.

14. An autonomous control apparatus for controlling operation of a vehicle, the autonomous control apparatus comprising:

at least one memory that stores instructions; and at least one processor, wherein, by executing the instructions, the at least one processor acquires driving information including one or more of a memory path, a user's driving method, a reference point, a forward target point, a next target point, an end point, and an obstacle list, from a vehicle or by detecting surroundings of the vehicle, configures a control method for the vehicle based on a behavior tree by using the driving information, configures a driving method for the vehicle based on the driving information and the control method, and controls the vehicle by applying the driving method, wherein configuring the control method further comprises:

determining whether a dangerous obstacle is contained in the obstacle list;

calculating avoidance points spaced apart from the forward target point by a predetermined distance in a longitudinal direction and a transverse direction; and generating an avoidance path based on the avoidance points upon determining that the dangerous obstacle is contained in the obstacle list, wherein the dangerous obstacle corresponds to an obstacle in which at least a portion of a bounding box of the obstacle is contained in a region of interest (ROI) in front of the vehicle, wherein the memory path is a same path as traveled by a user to manually park the vehicle, wherein the reference point is defined as a front center point of the vehicle, wherein the forward target point is on the memory path and spaced apart from the reference point by a first distance, wherein the next target point is on the memory path and spaced apart from the reference point by a second distance greater than the first distance, and wherein the obstacle list includes a list of obstacles around the vehicle.

15. The autonomous control apparatus of claim 14, further comprising at least one sensor for acquiring the driving information or detecting the surroundings of the vehicle.

16. The autonomous control apparatus of claim 14, further comprising a controller for configuring the control method of the vehicle, configuring the driving method of the vehicle, and controlling the vehicle.

17. A vehicle comprising the autonomous control apparatus of claim 14.

18. A non-transitory computer-readable recording medium containing program instructions executed by a processor, the computer readable medium comprising:

program instructions that acquire driving information including one or more of a memory path, a user's driving method, a reference point, a forward target point, a next target point, an end point, and an obstacle list, from the vehicle or by detecting, by the at least one sensor, surroundings of a vehicle;

program instructions that configure a control method for the vehicle based on a behavior tree by using the driving information;

program instructions that configure a driving method for the vehicle based on the driving information and the control method; and program instructions that control the vehicle by applying the driving method, wherein configuring the control method further comprises:

determining whether a dangerous obstacle is contained in the obstacle list;

calculating avoidance points spaced apart from the forward target point by a predetermined distance in a longitudinal direction and a transverse direction; and generating an avoidance path based on the avoidance points upon determining that the dangerous obstacle is contained in the obstacle list, wherein the dangerous obstacle corresponds to an obstacle in which at least a portion of a bounding box of the obstacle is contained in a region of interest (ROI) in front of the vehicle, wherein the memory path is a same path as traveled by a user to manually park the vehicle, wherein the reference point is defined as a front center point of the vehicle, wherein the forward target point is on the memory path and spaced apart from the reference point by a first distance, wherein the next target point is on the memory path and spaced apart from the reference point by a second distance greater than the first distance, and wherein the obstacle list includes a list of obstacles around the vehicle.

* * * * *